(12) United States Patent
Okada

(10) Patent No.: US 11,628,804 B2
(45) Date of Patent: Apr. 18, 2023

(54) STEERING LOCK DEVICE

(71) Applicant: ALPHA CORPORATION, Kanagawa (JP)

(72) Inventor: Takahiro Okada, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 904 days.

(21) Appl. No.: 16/521,440

(22) Filed: Jul. 24, 2019

(65) Prior Publication Data

US 2019/0344751 A1 Nov. 14, 2019

Related U.S. Application Data

(63) Continuation of application No. PCT/JP2018/003309, filed on Jan. 31, 2018.

(30) Foreign Application Priority Data

Jan. 31, 2017 (JP) .............................. JP2017-015452

(51) Int. Cl.
*B60R 25/0215* (2013.01)
*F16H 19/08* (2006.01)
(Continued)

(52) U.S. Cl.
CPC ....... *B60R 25/02153* (2013.01); *F16H 19/08* (2013.01); *F16H 25/12* (2013.01); *H02K 7/1166* (2013.01)

(58) Field of Classification Search
CPC ... B60R 25/02153; F16H 19/08; F16H 25/12; H02K 7/1166
See application file for complete search history.

(56) References Cited

U.S. PATENT DOCUMENTS 9,573,614 B2 * 2/2017 Park ................ B60R 25/02153
10,017,152 B2 * 7/2018 Laval .............. B60R 25/02153
(Continued)

FOREIGN PATENT DOCUMENTS

CN 104386019 A 3/2015
EP 1176065 A2 1/2002
(Continued)

OTHER PUBLICATIONS

The extended European search report issued by the European Patent Office dated Jul. 16, 2020, which corresponds to European Patent Application No. 18747837.5-1132 and is related to U.S. Appl. No. 16/521,440.
(Continued)

*Primary Examiner* — Randell J Krug
(74) *Attorney, Agent, or Firm* — Studebaker & Brackett PC

(57) ABSTRACT

A steering lock device includes a motor configured to rotate a motor shaft, a worm attached to the motor shaft of the motor, a main gear configured to rotate along with rotation of the worm, a cam member integrally provided with the main gear, and a rod including an insertion and extraction portion. The insertion and extraction portion is configured to be inserted into and extracted from an opening provided on a steering shaft side in accordance with an operation of the cam member along with rotation of the main gear. At least a part of at least one member of the worm and the insertion and extraction portion is configured to be accommodated in a circumferential region of the main gear when the main gear is viewed in a plan view along a rotation axis direction of the main gear.

5 Claims, 8 Drawing Sheets

(51) Int. Cl.
    *F16H 25/12*    (2006.01)
    *H02K 7/116*    (2006.01)

(56) References Cited

U.S. PATENT DOCUMENTS

| | | |
|---|---|---|
| 2002/0116962 A1 | 8/2002 | Zillmann |
| 2006/0053921 A1 | 3/2006 | Kawamura et al. |
| 2014/0318195 A1 | 10/2014 | Park |
| 2015/0251632 A1 | 9/2015 | Lehmeier et al. |
| 2015/0266449 A1 | 9/2015 | Laval et al. |
| 2016/0312499 A1 | 10/2016 | Fannon et al. |

FOREIGN PATENT DOCUMENTS

| | | | |
|---|---|---|---|
| EP | 1236626 A2 | | 9/2002 |
| EP | 1273493 A2 | | 1/2003 |
| EP | 1967424 A1 | | 9/2008 |
| EP | 1967425 A1 | * | 9/2008 ....... B60R 25/02153 |
| JP | 2004-092867 A | | 3/2004 |
| JP | 2006067694 A | | 3/2006 |
| JP | 2010-208365 A | | 9/2010 |
| JP | 2013-542124 A | | 11/2013 |
| JP | 2015-532234 A | | 11/2015 |
| JP | 2015-532235 A | | 11/2015 |
| JP | 2016-074425 A | | 5/2016 |
| KR | 100868167 B1 | * | 11/2008 |

OTHER PUBLICATIONS

An Office Action mailed by China National Intellectual Property Administration dated Jun. 3, 2021, which corresponds to Chinese Patent Application No. 201880009045.1 and is related to U.S. Appl. No. 16/521,440; with English language translation.

International Search Report issued in PCT/JP2018/003309; dated Apr. 24, 2018.

Written Opinion issued in PCT/JP2018/003309; dated Apr. 24, 2018.

* cited by examiner

STEERING LOCK DEVICE

CROSS REFERENCE TO RELATED APPLICATIONS

This application is a continuation of PCT application No. PCT/JP2018/003309, which was filed on Jan. 31, 2018 based on Japanese Patent Application No. 2017-015452 filed on Jan. 31, 2017, the contents of which are incorporated herein by reference.

TECHNICAL FIELD

The present disclosure relates to a steering lock device.

BACKGROUND ART

Conventionally, in a known steering lock device, a lock state is turned on by inserting a rod into an opening formed on a steering shaft side to lock steering, and an unlock state is turned on by extracting the rod. For example, Patent Literature 1 discloses a steering lock device which includes: a motor that rotates a motor shaft mounted on a frame member; a worm attached to the motor shaft; a gear that is engaged with the worm and rotates along with rotation of the worm; a cam member which is provided integrally with the gear and rotates around the same axis as the gear; and a rod that operates along with rotation of the cam member. However, since the motor shaft is inclined with respect to a frame surface, and a rotation surface of the gear is orthogonal to the frame surface, the steering lock device has a three-dimensional structure which is disadvantageous in respect of space.

Patent Literature 2 discloses a steering lock device in which an axial direction of a motor shaft and a rotation surface of each gear are disposed in parallel with respect to a frame surface. Since the steering lock device has the above arrangement, various configurations are disposed in a planar manner, and the entire steering lock device has a planar structure, which is advantageous in respect of space.

CITATION LIST

Patent Literature

[Patent Literature 1] JP-A-2013-542124
[Patent Literature 2] JP-A-2015-532234

SUMMARY OF INVENTION

A device which is more compact than the device in Patent Literature 2, or employment of a method which different from the method described in Patent Document 2 to make the device compact is studied.

The present disclosure relates to a steering lock device which can be made compact.

Problems that the Invention is to Solve

A steering lock device includes a motor configured to rotate a motor shaft, a worm attached to the motor shaft of the motor, a main gear configured to rotate along with rotation of the worm, a cam member integrally provided with the main gear, and a rod including an insertion and extraction portion. The insertion and extraction portion is configured to be inserted into and extracted from an opening provided on a steering shaft side in accordance with an operation of the cam member along with rotation of the main gear. At least a part of at least one member of the worm and the insertion and extraction portion is configured to be accommodated in a circumferential region of the main gear when the main gear is viewed in a plan view along a rotation axis direction of the main gear.

A steering lock device includes a motor configured to rotate a motor shaft mounted on a frame member and extending along a planar portion of the frame member, a worm attached to the motor shaft of the motor, a two-stage gear configured to rotate along the planar portion and including a first gear engaged with the worm and a second gear having a second rotation axis that is coaxial with a first rotation axis of the first gear, a main gear configured to rotate along the planar portion and includes internal teeth engaged with the second gear of the two-stage gear, and a rod configured to transition between two states along with rotation of the main gear. The two states are a restriction state that rotation of a steering shaft is restricted and a cancel state that the restriction is canceled.

Advantageous Effects of Invention

The steering lock device of the present disclosure can be made compact.

BRIEF DESCRIPTION OF DRAWINGS

FIG. 7A is an upper perspective view of the motor cover. FIG. 7B is a bottom perspective view of the motor cover. FIG. 7C is a view taken along Arrow C in FIG. 7B.

FIG. 10A shows the lock state. FIG. 10B shows the unlock state.

DESCRIPTION OF EMBODIMENTS

Hereinafter, the present embodiment will be described according to a preferred embodiment. The present embodiment is not limited to the embodiment described below, and can be appropriately modified without departing from the scope of the present embodiment. In the embodiment described below, some configurations are not shown or described, but it goes without saying that a known or well-known technique is applied as appropriate to details of an omitted technique within a range in which no contradiction occurs to contents described below.

Figure 1:
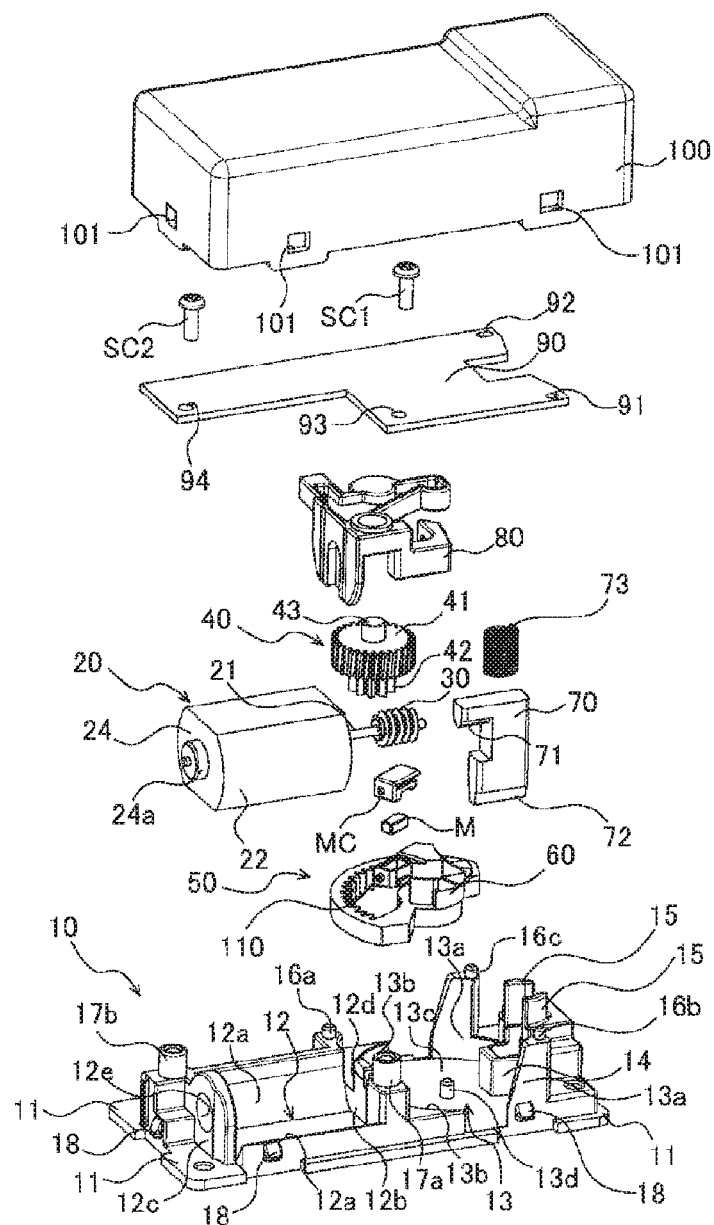
FIG. 1 is an exploded perspective view showing details of a steering lock device.
Figure 2:
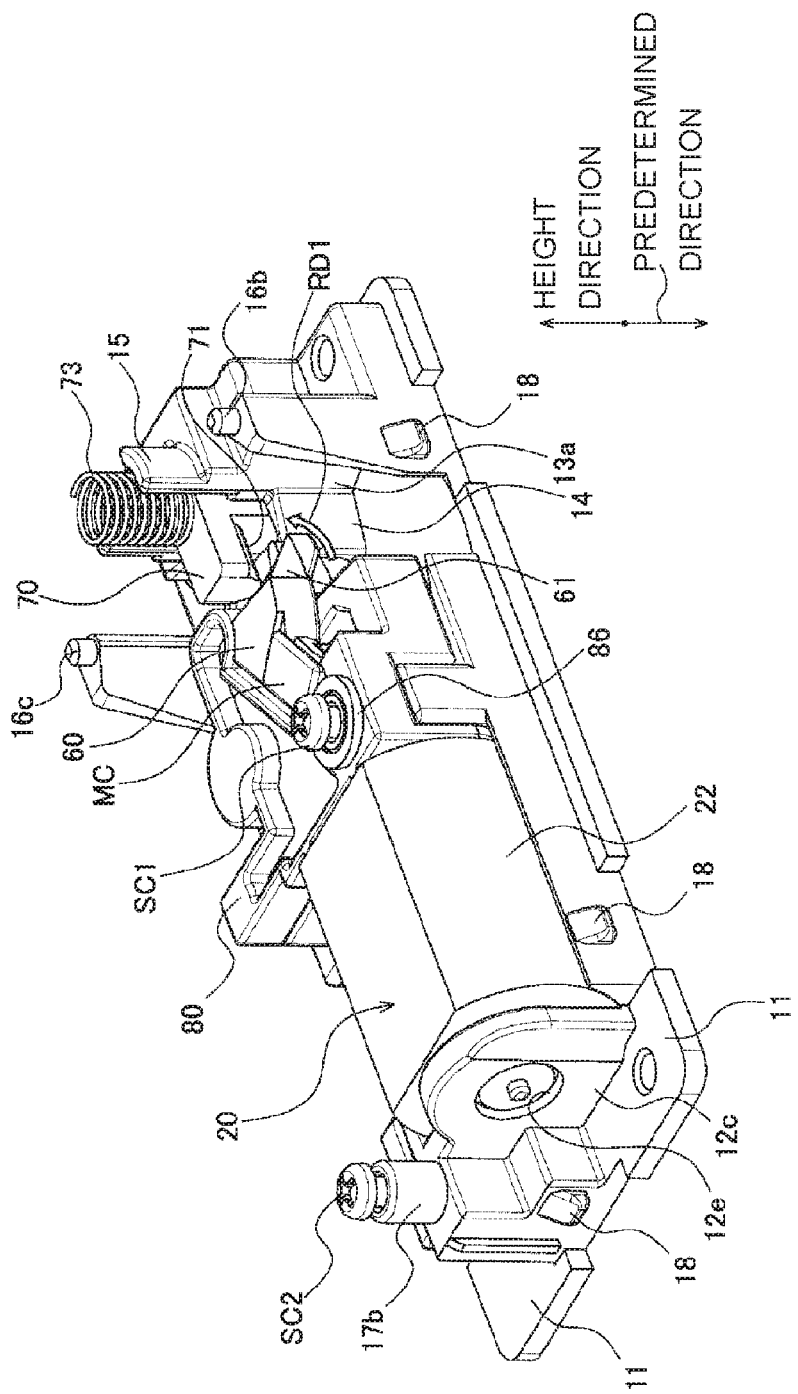
FIG. 2 is a perspective view of a case where a part of configurations shown in FIG. 1 are assembled to each other.
Figure 3:
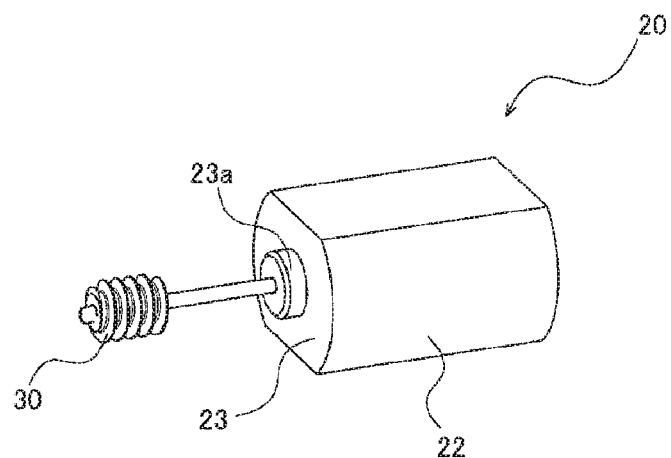
FIG. 3 is an enlarged perspective view of a motor shown in FIG. 1. The motor is shown in a perspective state from a direction which is different from the direction in FIG. 1.
Figure 4:
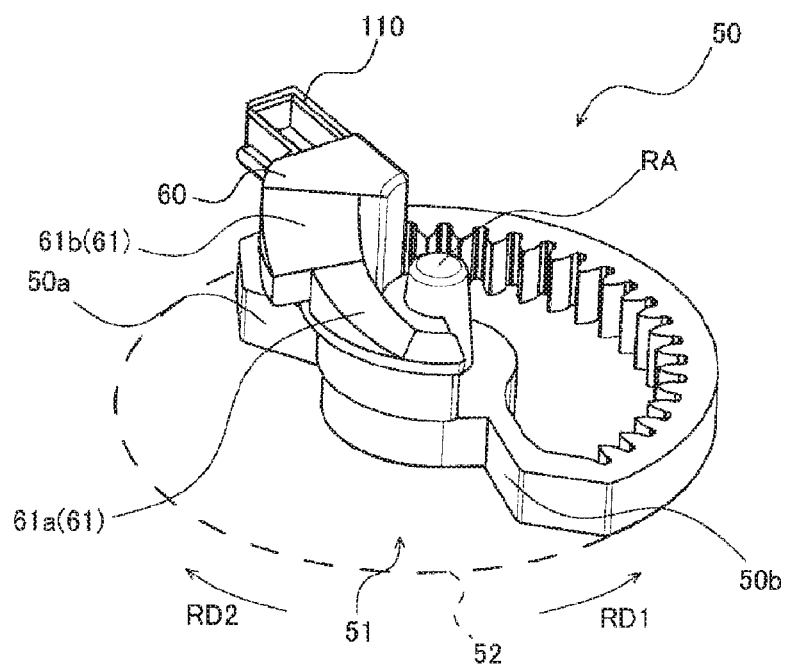
FIG. 4 is an enlarged perspective view of a main gear shown in FIG. 1. The main gear is shown in a perspective state from a direction which is different from the direction in FIG. 1.
Figure 5:
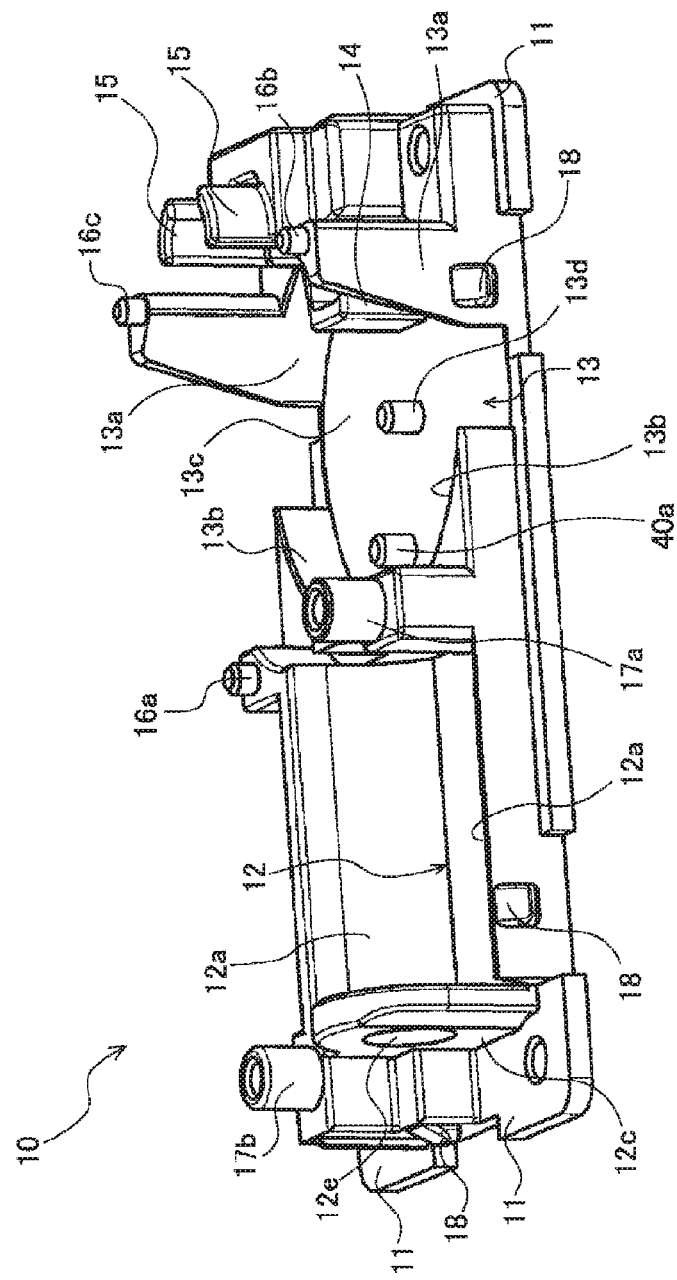
FIG. 5 is an enlarged perspective view of a frame member shown in FIG. 1. The frame member is shown in a perspective state from a direction which is different from the direction in FIG. 1.
Figure 6:
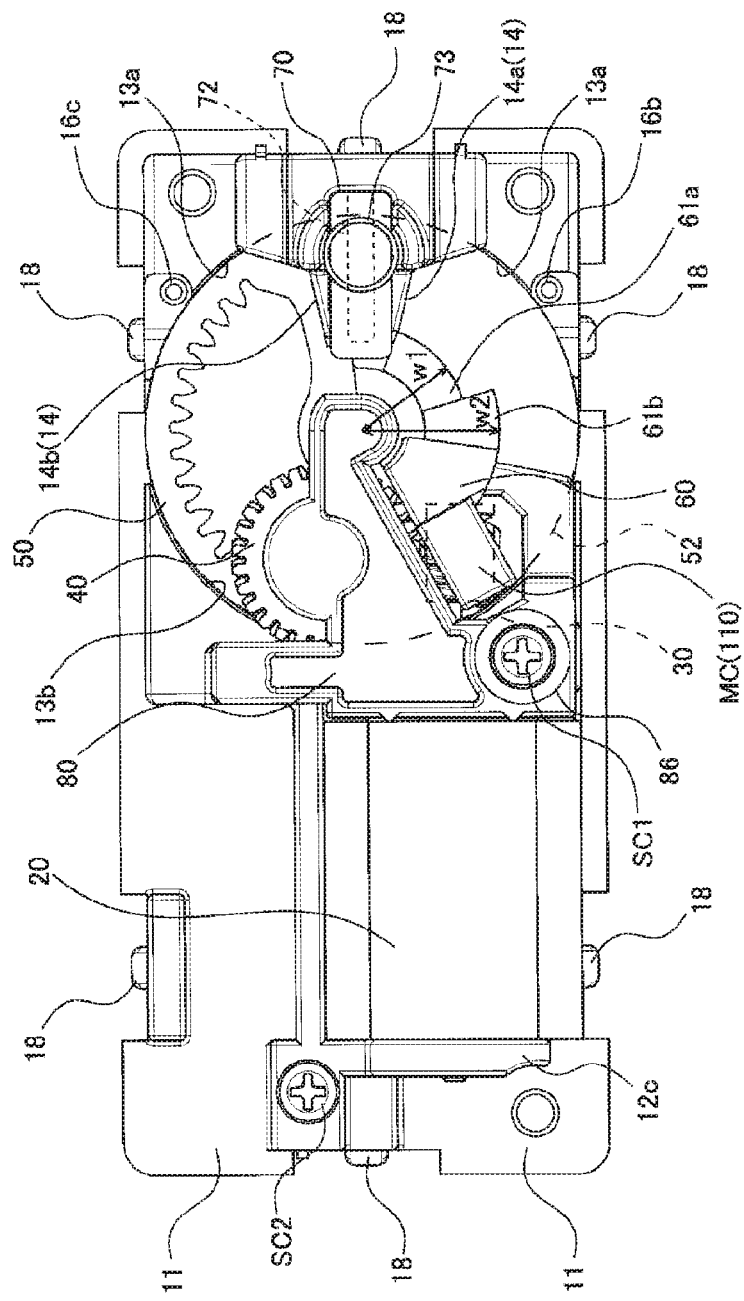
FIG. 6 is a top view of a part of configurations shown in FIG. 2.

FIG. 1 is an exploded perspective view showing details of a steering lock device according to the present embodiment, and FIG. 2 is a perspective view of a case where a part of configurations shown in FIG. 1 are assembled to each other. FIGS. 3, 4, and 5 are enlarged views showing a part of the configurations shown in FIG. 1. FIG. 6 is a top view of a part of the configurations shown in FIG. 2.

As shown in FIGS. 1 and 2, a steering lock device 1 according to the present embodiment is schematically configured by a frame member 10, a motor 20, a worm 30, a two-stage gear 40, a main gear 50, a cam member 60, a rod 70, a motor cover 80, a printed board 90, and a cover 100.

In such a steering lock device 1, the worm 30, the two-stage gear 40, the main gear 50, and the cam member 60 are operated along with an operation of the motor 20, and the rod 70 is inserted into and extracted from an opening (reference sign O in FIG. 10A described below) of a steering post (reference sign SP in FIG. 10A described below) in which a steering shaft (reference sign SS in FIG. 10A described below) is inserted. A state when the rod 70 is inserted is a lock state in which rotation of the steering shaft is restricted, and a state when the rod 70 is extracted is an unlock state in which the restriction is canceled. Hereinafter, each portion will be described in detail.

The frame member 10 shown in FIG. 1 is a metal member that supports various components of the steering lock device 1. The frame member 10 includes a plate-shaped planar portion 11, a screw receiving portion which has a wall portion standing oppositely to the planar portion 11 and a screw hole, and the like.

As shown in FIGS. 1 and 3, the motor 20 has a motor shaft 21. The motor shaft 21 is rotated upon receiving a power supply. The motor 20 is mounted on the frame member 10. The motor shaft 21 is disposed in a manner of extending along the planar portion 11 of the frame member 10.

Here, a motor housing portion 12 (see FIG. 1) is formed in the frame member 10. The motor housing portion 12 is configured by a pair of curved walls 12a that match a shape of a side surface 22 of the motor 20, a front wall 12b and a rear wall 12c that are in contact with a front surface 23 and a rear surface 24 of the motor 20. An upper opening U-shaped groove 12d through which the motor shaft 21 passes is formed in the front wall 12b of the motor housing portion 12. A circular opening 12e is formed in the rear wall 12c of the motor housing portion 12. Here, as shown in FIG. 1, the rear surface 24 of the motor 20 includes a cylindrical protruding portion 24a that holds the motor shaft 21. The cylindrical protruding portion 24a of the motor 20 is fitted into the circular opening 12e of the rear wall 12c.

The worm 30 shown in FIGS. 1 and 3 is a screw-shaped gear made of metal or resin, which is attached to a tip end side of the motor shaft 21. The two-stage gear 40 shown in FIG. 1 is a metal or resin gear in which a first gear 41 and a second gear 42 having different numbers of teeth are provided coaxially with a rotation shaft 43 so as to overlap with each other in two stages in an integrated manner. The first gear 41 of the two-stage gear 40 is engaged with the worm 30, and the second gear 42 is engaged with the main gear 50. The number of teeth of the first gear 41 is more, and the number of teeth of the second gear 42 is less. The two-stage gear 40 rotates along the planar portion 11 of the frame member 10 along with rotation of the worm 30.

The main gear 50 is a metal or resin gear that is engaged with the second gear 42 of the two-stage gear 40, and is configured to rotate along the planar portion 11 of the frame member 10 like the two-stage gear 40. A large number of internal teeth are formed in the main gear 50. The large number of internal teeth are engaged with the second gear 42.

Here, a main gear housing portion 13 is formed in the frame member 10. The main gear housing portion 13 is configured by wall portions 13a, 13b and a bottom surface 13c formed along an outer shape of the main gear 50. A substantially circular groove portion is formed by these wall portions 13a, 13b and the bottom surface 13c, and the main gear 50 is fitted into the groove portion. The bottom surface 13c is parallel to the planar portion 11, and is formed to be flush with the planar portion 11, or is formed at a height different from a height of the planar portion 11. A rotation shaft 13d of the main gear 50 protrudes upward at a center of the bottom surface 13c of the main gear housing portion 13. With such a configuration, the main gear 50 rotates around the rotation shaft 13d in a manner of sliding on the rotation shaft 13d or the wall portions 13a and 13b. As shown in FIG. 5, a rotation shaft 40a of the two-stage gear 40 is provided on the bottom surface 13c of the main gear housing portion 13. The rotation shaft 40a is provided closer to the second wall portion 13b side than the rotation shaft 13d. The two-stage gear 40 rotates around the rotation shaft 40a.

The main gear 50 shown in FIGS. 1 and 4 is an arc-shaped (substantially semicircular) gear having inner teeth in an arc shape which forms a part of a circle. Therefore, the main gear 50 has a shape in which a space 51 is secured in a remaining portion of the circle (a portion exclusive of the substantially semicircular main gear 50), and a stopper 14 (see FIGS. 1 and 2) can be formed in a portion of the space 51 in a circumferential region 52 of the main gear 50. As is apparent from FIGS. 1 and 2, the stopper 14 protrudes from the first wall portion 13a toward the rotation shaft 13d into the main gear housing portion 13, and is in contact with the main gear 50 to restrict excessive rotation.

More specifically, in the main gear 50, portions extending in radial directions of the gear having the substantially semicircular shape function as an unlock side stopper portion 50a and a lock side stopper portion 50b. The stopper 14 of the frame member 10 also includes an unlock side stopper portion 14a and a lock side stopper portion 14b (see FIG. 6). When the main gear 50 rotates in a rotation direction RD 1 described below, the rod 70 operates so as to enter an unlock state. At this time, the unlock side stopper portion 50a of the main gear 50 is in contact with the unlock side stopper portion 14a of the stopper 14 to prevent excessive rotation of the main gear 50 or the like. Similarly, when the main gear 50 rotates in a rotation direction RD 2 described below, the rod 70 operates so as to enter a lock state. At this time, the lock side stopper portion 50b of the main gear 50 is in contact with the lock side stopper portion 14b of the stopper 14 to prevent the excessive rotation of the main gear 50 or the like (a state shown in FIG. 6).

The cam member 60 shown in FIGS. 1 and 4 is a member that rotates along the planar portion 11 along with rotation of the main gear 50. In the present embodiment, the cam member 60 is provided integrally with the main gear 50 in an upper portion of the main gear 50. As shown in FIG. 4, the cam member 60 includes an inclined portion 61. The inclined portion 61 extends along a rotation direction of the main gear 50 and is inclined with respect to the planar portion 11. The inclined portion 61 includes a first inclined portion 61*a* located on an inclined lower side and a second inclined portion 61*b* located on an inclined upper side. Here, a direction in which the inclined lower side of the cam member 60 rotates as a head is referred to as one rotation direction RD 1, and a direction opposite to the one rotation direction is referred to as the other rotation direction RD 2.

As shown in FIG. 6, a width w1 of the first inclined portion 61*a* (a distance from a rotation center of the cam member 60) is smaller than a width w2 of the second inclined portion 61*b*. That is, a width of the inclined portion 61 of the cam member 60 on the one rotation direction RD 1 side is smaller than a width on the other rotation direction RD 2 side.

The rod 70 shown in FIG. 1 is a plate-shaped metal member, which includes a contact portion 71 that can contact the inclined portion 61, and an insertion and extraction portion 72 that is inserted into and extracted from the opening of the steering shaft. Further, the steering lock device 1 includes a spring member 73 that urges the rod 70 in a predetermined direction and inserts the rod 70 into the opening on the steering shaft side. The spring member 73 is held by a pair of arc walls 15 formed in the frame member 10 (see FIGS. 1 and 2).

In an example shown in FIG. 2, the rod 70 is in a lock state in which the rod 70 is inserted into the opening on the steering shaft side. In this state, the main gear 50 rotates, and the cam member 60 is rotated in the one rotation direction RD 1 along with the rotation of the main gear 50. In this case, first, the inclined portion 61 of the cam member 60 contacts the contact portion 71. The cam member 60 further rotates in the one rotation direction RD 1, then the cam member 60 pushes up the rod 70 in a direction opposite to the predetermined direction against an urging force of the spring member 73. As a result, the insertion and extraction portion 72 of the rod 70 is pulled out from the opening on the steering shaft side, thus the steering lock device 1 enters the unlock state.

Figure 7A:
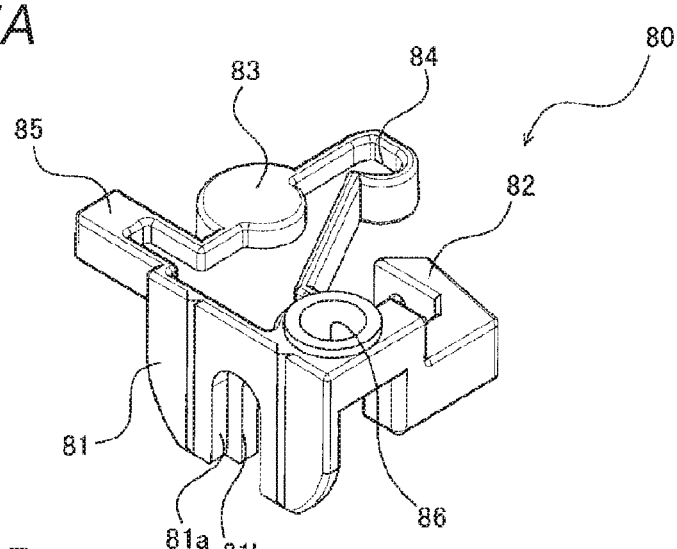
FIGS. 7A to 7C are enlarged perspective views of a motor cover shown in FIG. 1.
Figure 7B:
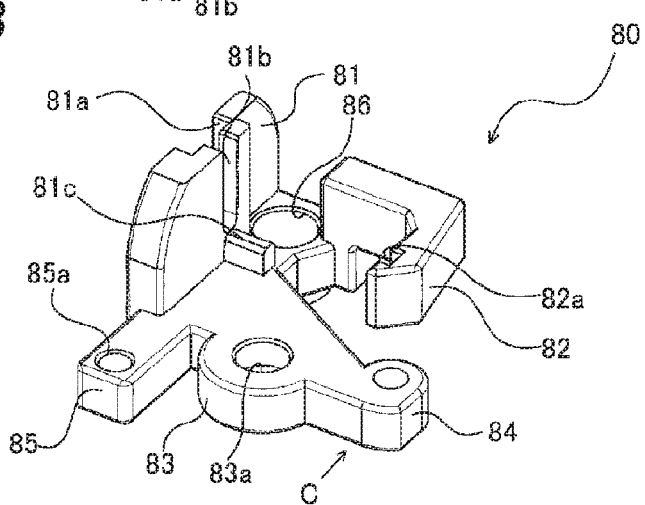
Figure 7C:
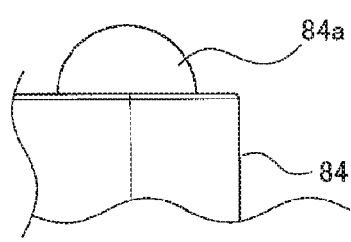

FIGS. 7A to 7C are enlarged perspective views of a motor cover 80 shown in FIG. 1, FIG. 7A is an upper perspective view of the motor cover 80, FIG. 7B is a bottom perspective view of the motor cover 80, and FIG. 7C is a view taken along Arrow C in FIG. 7B. The motor cover 80 shown in FIG. 7A and FIG. 7B includes a press-fitted wall 81 and a shaft receiving portion 82.

The press-fitted wall 81 is a portion press-fitted between the front surface 23 of the motor 20 and the front wall 12*b* of the motor housing portion 12 in a state where the motor 20 is disposed in the motor housing portion 12. The motor 20 is fixed by press-fitting the press-fitted wall 81. A first U-shaped groove 81*a*, a second U-shaped groove 81*b*, and a protrusion 81*c* are formed in the press-fitted wall 81.

The first U-shaped groove 81*a* is a groove cut upward from a lower end of the press-fitted wall 81, and a cylindrical protruding portion 23*a* formed on the front surface 23 of the motor 20 is sized to fit therein. The second U-shaped groove 81*b* is formed in the first U-shaped groove 81*a*, and is cut upward from the lower end of the press-fitted wall 81. The second U-shaped groove 81*b* is a groove used as a passage of the motor shaft 21. The protrusion 81*c* protrudes from an inner surface side of the motor cover 80, and is fitted into the U-shaped groove 12*d* of the front wall 12*b* when the press-fitted wall 81 is press-fitted. Therefore, a position of the motor shaft 21 is limited by the U-shaped groove 12*d* of the front wall 12*b* and the protrusion 81*c* of the motor cover 80.

The shaft receiving portion 82 is a portion that supports the tip end of the motor shaft 21. The shaft receiving portion 82 includes a shaft receiving groove 82*a* that receives the tip end of the motor shaft 21. A lower side of the shaft receiving groove 82*a* is opened, so that the tip end of the motor shaft 21 is fitted therein at the time when the press-fitted wall 81 is press-fitted after the motor 20 is installed in the frame member 10.

Further, the motor cover 80 shown in FIGS. 7A and 7B includes a gear bearing portion 83 and a pressing portion 84. The gear bearing portion 83 serves as a receiving portion of the rotation shaft 43 of the two-stage gear 40, a bearing hole 83*a* where the rotation shaft 43 is fitted is formed on an inner surface side of the gear bearing portion 83. The pressing portion 84 is a portion that prevents rising caused by rotation of the main gear 50 and the cam member 60, as shown in FIG. 7C, the pressing portion 84 is provided with a contact portion 84*a* that has a hemispherical shape (a shape of a cross-section R). The contact portion 84*a* is configured to hold a rotation axis RA of the main gear 50 and the cam member 60. The pressing portion 84 prevents the main gear 50 and the cam member 60 from rising, thereby preventing the main gear 50 from escaping out of the main gear housing portion 13. Particularly, when an R portion of the contact portion 84*a* abuts on the rotation axis RA, the rotation axis RA can be held stably even if the rotation axis RA of the main gear 50 is inclined.

In addition, the motor cover 80 includes a fixing portion 85 that extends laterally. A circular opening 85*a* is formed on an inner surface side of the fixing portion 85. A cylindrical protrusion 16*a* formed in the frame member 10 is fitted in the opening 85*a*. Therefore, the fixing portion 85 functions as one instrument for fixing the motor cover 80.

The printed board 90 shown in FIG. 1 is provided with a circuit that drives the motor 20 and the like. Here, as shown in FIG. 4, a magnet housing portion 110 is integrally formed on the other rotation direction RD 2 side of the cam member 60. As shown in FIG. 1, a magnet M is housed in the magnet housing portion 110, and a magnet case MC is attached to the magnet housing portion 110. A circuit capable of detecting a position of the magnet M and detecting rotation amounts of the main gear 50 and the cam member 60 is mounted on the printed board 90.

The printed board 90 is formed with through holes 91, 92 through which two cylindrical protrusions 16*b* and 16*c* formed on the frame member 10 are fitted, and two screw holes 93 and 94 through which screws SC 1 and SC 2 are inserted. The two screw holes 93 and 94 correspond to two screw receiving portions 17*a* and 17*b* formed in the frame member 10. The two screws SC 1 and SC 2 reach the screw receiving portions 17*a* and 17*b* of the frame member 10 via the screw holes 93 and 94 of the printed board 90 and are fastened.

Here, a through hole 86 is formed in the motor cover 80. The first screw receiving portion 17*a* of the two screw receiving portions 17*a* and 17*b* is inserted into the through hole 86. A position of the motor cover 80 is fixed by inserting the first screw receiving portion 17*a*. That is, the first screw receiving portion 17*a* functions as one instrument for fixing the motor cover 80.

Figure 8:
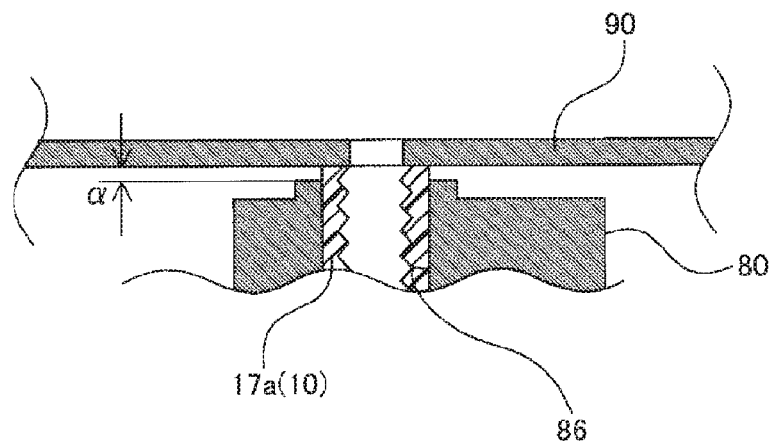
FIG. 8 is a cross-sectional view showing a laminated state of a first screw receiving portion, a motor cover, and a printed board.

FIG. 8 is a cross-sectional view showing a laminated state of the first screw receiving portion 17*a*, the motor cover 80, and the printed board 90. As shown in FIG. 8, the first screw receiving portion 17*a* is inserted into the through hole 86 of the motor cover 80, and the upper end of the first screw receiving portion 17*a* protrudes from the motor cover 80 (protrudes by a in FIG. 8). Here, since the motor cover 80 is made of resin while the frame member 10 is made of metal, the printed board 90 can be attached to the metal frame member 10 having high rigidity through providing such a protruding state.

The cover 100 shown in FIG. 1 houses various components together with the frame member 10. A plurality of openings 101 are formed on a side surface of the cover 100. Protrusions 18 formed on the frame member 10 are fitted into the plurality of openings 101, thus the cover 100 is attached to the frame member 10 by fitting the protrusions 18 into the opening 101.

Particularly, the steering lock device 1 according to the present embodiment is as shown in FIG. 6, the entire worm 30 and a part of the insertion and extraction portion 72 of the rod 70 are included in the circumferential region 52 of the main gear 50 when the main gear 50 is viewed in a plan view along the rotation axis RA of the main gear (see FIG. 4). In the present embodiment, both the worm 30 and the insertion and extraction portion 72 are included in the circumferential region 52, but the present invention is not limited thereto, and a configuration may be employed in which only one of the worm 30 and the insertion and extraction portion 72 is included. Further, although the worm 30 is entirely included in the circumferential region 52, but the present invention is not limited thereto, and a configuration may be employed in which only a part of the worm 30 is included in the circumferential region 52. Similarly, although the part of the insertion and extraction portion 72 is accommodated in the circumferential region 52, but the present invention is not limited thereto, and the insertion and extraction portion 72 may be entirely included in the circumferential region 52.

Next, functions of the steering lock device 1 according to the present embodiment will be described. First, the steering lock device 1 according to the present embodiment has a structure that is made compact for the following reasons.

The steering lock device 1 according to the present embodiment is configured such that the entire worm 30 and the part of the insertion and extraction portion 72 are included in the circumferential region 52 of the main gear when the main gear 50 is viewed in the plan view. Therefore, the worm 30 and the rod 70 are arranged in a manner of overlapping with the main gear 50, thus the device of the present embodiment is made compact.

Particularly, as is apparent from FIG. 2, the worm 30 is located on the predetermined direction side of the motor cover 80, and does not exceed an upper end surface of the cam member 60 in a height direction. That is, since the worm 30 is included in the circumferential region 52 of the main gear 50 and is lower in height than the upper end surface of the cam member 60, a thickness is not increased even if the worm 30 is overlapped in the circumferential region 52 of the main gear 50, thus the device of the present embodiment is further made compact.

Further, since the motor shaft 21 extends along the planar portion 11 while the two-stage gear 40 and the main gear 50 rotate along the planar portion 11, a planar structure is formed as a whole, thus the device of the present embodiment is made compact.

In addition, since the main gear 50 having the internal teeth is provided, a part of the two-stage gear 40 (a part as shown in FIG. 6, but the entire two-stage gear 40 may also be acceptable) is disposed in the circumferential region 52 of the main gear 50, thus the device of the present embodiment is more compact when compared with a case where the main gear 50 and the two-stage gear 40 are adjacent to each other along the planar portion 11.

Further, in the present embodiment, since the two-stage gear 40 can be disposed on the main gear 50 to achieve a compact size, a diameter of the main gear 50 is also increased as a result. Therefore, a substantial number of teeth of the main gear 50 (the number of teeth that should exist when the main gear 50 is a circular gear) can be increased, and a reduction ratio may be increased. Accordingly, reduction in an operating force of the rod 70 due to the compact size is also prevented.

For example, in the present embodiment, the first gear 41 of the two-stage gear 40 has a number of teeth of 2X (X is an arbitrary integer), and the number of teeth of the second gear 42 is X. Further, since the main gear 50 is an arc-shaped gear having an actual number of teeth of Y, and the substantial number of teeth when the main gear 50 is assumed to be a circular gear is, for example, 2Y. When the number of teeth is as above, the reduction ratio can be $(2X/1) \times (2Y/X) = 4Y$.

Figure 9:
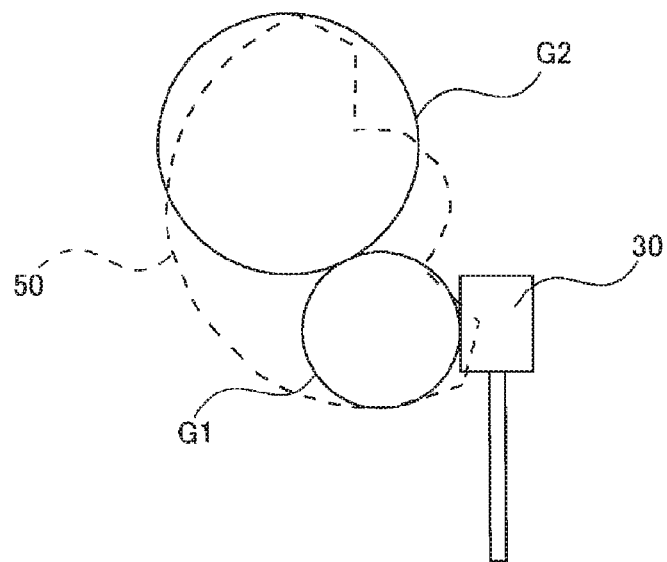
FIG. 9 is a schematic view showing a case when a single-stage gear is employed instead of a two-stage gear, while an external teeth main gear is employed instead of an internal teeth main gear.

FIG. 9 is a schematic view showing a case when a single-stage gear is employed instead of the two-stage gear 40, while an external teeth main gear is employed instead of the internal teeth main gear 50. As shown in FIG. 9, a single-stage gear G1 and an external teeth main gear G2 are provided in a space similar to the present embodiment, and the single-stage gear G1 and the external teeth main gear G2 are adjacent to each other along the planar portion 11. Further, the single-stage gear G1 has the same number of teeth as the second gear 42. In this case, since a diameter of the external teeth main gear G2 is smaller than the diameter of the internal teeth main gear 50, even if the number of teeth is increased as much as possible, the main gear G2 has the same substantial number of teeth as the main gear 50, which is 2Y. Therefore, the reduction ratio is $(X/1) \times (2Y/X) = 2Y$, and the operating force of the rod is reduced to a half as compared with the present embodiment, for example. Meanwhile, in order to realize the same reduction ratio as the reduction ratio of the present embodiment, it is necessary to set the number of teeth of the main gear G2 to 4Y, which leads to an increase in a size of the main gear G2, which makes it difficult to make the device of the present embodiment compact.

As described above, the steering lock device 1 according to the present embodiment is not only compact but also prevents the reduction in the operating force of the rod 70 caused by the compact size.

In the present embodiment, since the main gear 50 is configured as an arc-shaped gear, the stopper 14 can be disposed in the space 51 which is a remaining portion of the circumferential region 52, or a part of the rod 70 can be disposed therein, thereby making the device of the present embodiment compact.

Figure 10A:
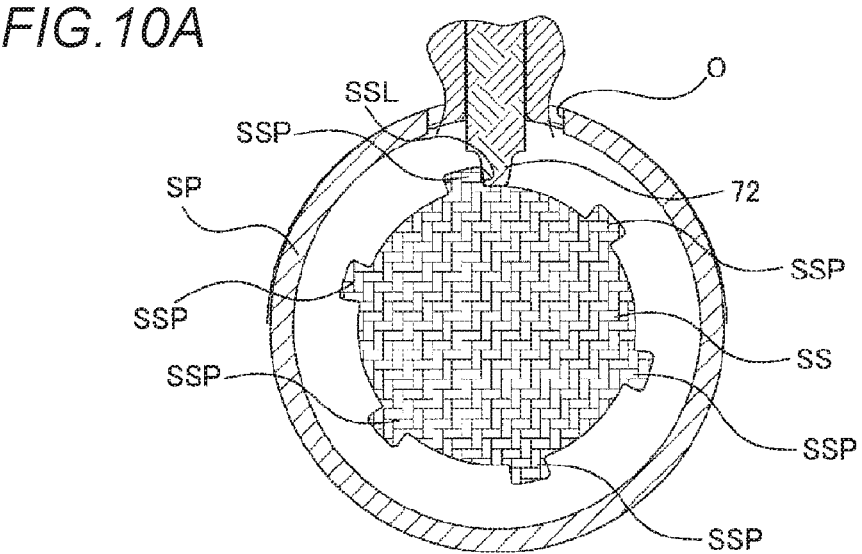
FIGS. 10A and 10B are schematic cross-sectional views showing a lock state and an unlock state of a steering shaft.
Figure 10B:
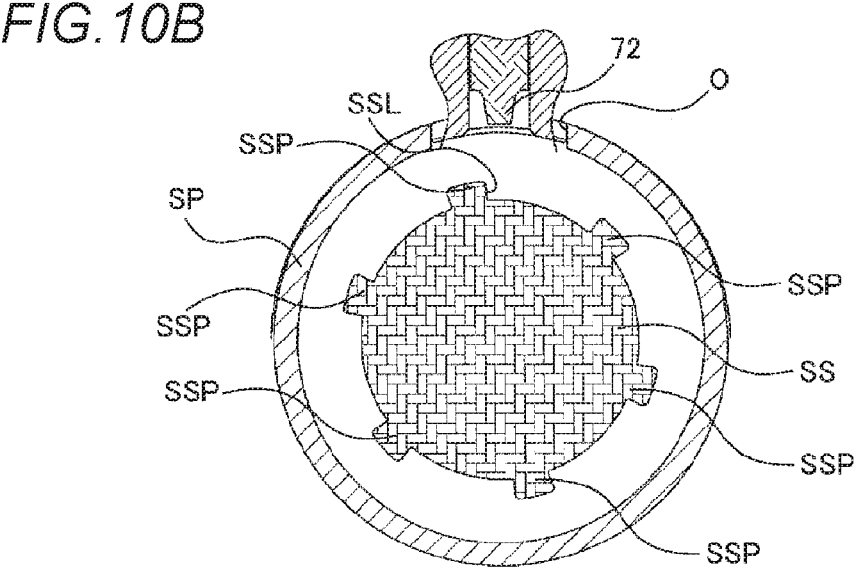

Further, in the present embodiment, an initial operating force at the time of pulling out the rod 70 is improved. FIGS. 10A and 10B are schematic cross-sectional views showing a lock state and an unlock state of the steering shaft, FIG. 10A shows the lock state, and FIG. 10B shows the unlock state. As shown in FIG. 10A and FIG. 10B, an opening O is formed in the steering post SP through which the steering shaft SS is inserted. The steering shaft SS is formed with a plurality of (for example, six) protruding portions SSP protruding radially outward. When the insertion and extraction portion 72 of the rod 70 is inserted into the opening O, the insertion and extraction portion 72 reaches between the protruding portions SSP of the steering shaft SS, the steering shaft SS can only rotate between the protruding portions SSP and is in the lock state. In this lock state, since the insertion and extraction portion 72 may be in contact with a side wall SSL of the protruding portion SSP, it is preferable that the initial operating force at the time of pulling out the rod 70 is high.

Here, in the present embodiment, as shown in FIG. 6, the width w1 of the first inclined portion 61a is smaller than the width w2 of the second inclined portion 61b. A force generated by each of the inclined portions 61a and 61b (a force that pulls up the rod 70) depends on a distance from the rotation center to each of the inclined portions 61a and 61b. Therefore, the rod 70 can be pulled out by the force of the first inclined portion 61a which is larger than the force of the second inclined portion 61b, and the initial operating force is realized without interfering with transitioning to the unlock state.

In this way, according to the steering lock device 1 of the present embodiment, since the entire worm 30 and a part of the rod 70 (at least a part of at least one of the worm 30 and the rod 70 is also acceptable) are included in the circumferential region 52 of the main gear 50, the worm 30 and the rod 70 are overlapped with the main gear 50 when the main gear 50 is viewed in the plan view, thereby providing the steering lock device 1 which can be made compact.

Since the motor shaft 21 extends along the planar portion 11 while both the two-stage gear 40 and the main gear 50 rotate along the planar portion 11, the planar structure is formed as a whole, thus the device of the present embodiment can be made compact. Further, since the two-stage gear 40 is provided, which includes the first gear 41 engaged with the worm 30 and the second gear 42 engaged with the internal teeth main gear 50, the two-stage gear 40 can be disposed in a manner of overlapping with the main gear 50 (at least a part of the two-stage gear 40 can be disposed in the circumferential region 52), thus the device of the present embodiment can be more compact when compared with the case where the main gear 50 and the two-stage gear 40 are adjacent to each other along the planar portion 11. Therefore, the steering lock device 1 can be provided with a compact size.

Since the two-stage gear 40 can be disposed on the main gear 50 (in the circumferential region 52), the diameter of the main gear 50 is increased, thus the substantial number of teeth of the main gear 50 and the reduction ratio can be increased. Accordingly, the reduction in the operating force of the rod 70 due to the compact size can be prevented.

Further, since the width w1 of the inclined portion 61 from the rotation center on the one rotation direction RD 1 side is smaller than the width w2 from the rotation center on the other rotation direction RD 2 side, when the inclined portion 61 is rotated on the one rotation direction RD 1 side, the force acting on the rod 70 can be improved since the width w1 is small, and the initial force when the rod 70 is moved in the opposite direction of the predetermined direction can be increased. Accordingly, the rod 70 is in contact with an opening side wall OL of the steering shaft SS or the like, and the required initial force can be realized when the rod 70 is pulled out and the restriction is canceled.

In addition, since the main gear 50 is the arc-shaped gear having inner teeth in the arc shape, the space 51 is formed in the remaining portion of the circle, the stopper 14 and other members can be disposed in the space 51, thus the device of the present embodiment can be made more compact.

The steering lock device according to the present embodiment is described above on the basis of the embodiment, but the present embodiment is not limited thereto, and modifications may be made without departing from the scope of the present embodiment, and other techniques may be combined if possible.

For example, in the above embodiment, the steering lock device 1 is assumed to have a configuration in which the rod 70 pierces the opening O of the steering post SP, but the present invention is not limited thereto, and another member may be operated by the rod 70 and pierce the opening O. Further, the insertion and extraction portion 72 of the rod 70 according to the above embodiment is not limited to the configuration shown in FIGS. 10A and 10B as long as the insertion and extraction portion 72 is inserted into and extracted from the opening on the steering shaft SS side. For example, the insertion and extraction portion 72 may be configured to be inserted into and extracted from an opening provided in the steering shaft SS, and other configurations may be employed as long as a lock state can be achieved.

In the present embodiment, the two-stage gear 40 is employed from the viewpoint of improving the operating force of the rod 70, but the present invention is not limited thereto, a single-stage gear that is vertically elongated in the height direction may be used instead of the two-stage gear 40, for example. An external teeth main gear having a substantially semicircular shape may be employed, and the part of the worm 30 or the rod 70 or the like may be included in the circumferential region using the remaining space of the circle. Further, a main gear and a two-stage gear (or a vertically elongated single-stage gear) having outer teeth in circular shapes may be employed, and all or a portion of the worm 30 may be contained within the circumferential region.

In addition, in the present embodiment, the inclined portion 61 includes the first inclined portion 61a, the second inclined portion 61b, and two widths w1 and w2, but the present invention is not limited thereto, and three or more widths may be included to form an embodiment in which the widths are continuously changed.

This application is based on the Japanese Patent Application filed on Jan. 31, 2017 (Japanese Patent Application No. 2017-015452), the contents of which are incorporated herein by reference.

REFERENCE SIGNS LIST

10. Frame Member
11. Planar Portion
14. Stopper
20. Motor
21. Motor Shaft
30. Worm
40. Two-Stage Gear
41. First Gear
42. Second Gear
43. Rotation Shaft
50. Main Gear
51. Space
52. Circumferential Region
60. Cam Member
61. Inclined Portion
61a. First Inclined Portion
61b. Second Inclined Portion
70. Rod
71. Contact Portion
72. Insertion and Extraction Portion
RD1. One Rotation Direction
RD2. Other Rotation Direction
SS. Steering Shaft

What is claimed is:

1. A steering lock device comprising:
   a motor configured to rotate a motor shaft;
   a worm attached to the motor shaft of the motor;
   a main gear configured to rotate along with rotation of the worm;
   a cam member integrally provided with the main gear; and
   a rod including an insertion and extraction portion,
   wherein the insertion and extraction portion is configured to be inserted into and extracted from an opening provided on a steering shaft side in accordance with an operation of the cam member along with rotation of the main gear, and
   wherein at least a part of the worm and at least a part of the insertion and extraction portion are configured to be accommodated within and overlapping a circumferential region of the main gear between an outer periphery of the main gear and a rotation axis of the main gear when the main gear is viewed in a plan view along a rotation axis direction of the main gear.

2. The steering lock device according to claim 1,
   wherein the main gear is an arc-shaped gear including teeth in an arc shape, which forms a part of a circle.

3. The steering lock device according to claim 1,
   wherein the entire worm and the part of the insertion and extraction portion are configured to be accommodated within and overlapping the circumferential region of the main gear when the main gear is viewed in the plan view along the rotation axis direction of the main gear.

4. A steering lock device comprising:
   a motor configured to rotate a motor shaft mounted on a frame member and extending along a planar portion of the frame member;
   a worm attached to the motor shaft of the motor;
   a two-stage gear configured to rotate along the planar portion and including a first gear engaged with the worm and a second gear having a second rotation axis that is coaxial with a first rotation axis of the first gear;
   a main gear configured to rotate along the planar portion and including internal teeth engaged with the second gear of the two-stage gear; and
   a rod configured to transition between two states along with rotation of the main gear,
   wherein the two states are a restriction state that rotation of a steering shaft is restricted and a cancel state that the restriction is canceled.

5. The steering lock device according to claim 4, further comprising:
   a cam member configured to rotate along the planar portion along with rotation of the main gear and including an inclined portion which is inclined with respect to the planar portion and extends in a rotation direction; and
   a spring member configured to urge the rod in a predetermined direction to restrict the rotation of the steering shaft,
   wherein the rod includes a contact portion which contacts the inclined portion,
   wherein when the cam member rotates in one rotation direction while the inclined portion of the cam member is in contact with the contact portion, the rod is moved in a direction opposite to the predetermined direction so as to be transitioned to the cancel state that the restriction is canceled, and
   wherein a width from a rotation center at a side of the one rotation direction is smaller than a width from the rotation center at a side of another rotation direction which is opposite to the one rotation direction side, in the inclined portion of the cam member.

* * * * *